United States Patent Office 3,329,627
Patented July 4, 1967

3,329,627
SYNTHETIC ZEOLITES
Elroy Merle Gladrow and William Judson Mattox, Baton Rouge, La., assignors to Esso Research and Engineering Company, a corporation of Delaware
No Drawing. Filed Apr. 19, 1963, Ser. No. 274,300
12 Claims. (Cl. 252—452)

This invention relates to an improved process for preparing synthetic crystalline alumino-silicate zeolite materials and the zeolites thereby produced. Particularly, it relates to the preparation of crystalline alumino-silicate zeolite materials having relatively high silica to alumina mole ratios and distributed throughout a silica gel matrix. More particularly, it relates to the preparation of crystalline alumino-silicate zeolite materials having relatively high silica to alumina mole ratios which are crystallized from reaction mixtures having relatively low silica to alumina mole ratios and low water content, and which are then distributed throughout a silica gel matrix.

Crystalline alumino-silicate zeolites, commonly referred to as "molecular sieves," are well known in the art. They are characterized by their highly ordered crystalline structure and uniformly dimensioned pores, e.g. in the range of about 4 to 15 A. in diameter, and are distinguishable from each other on the basis of composition, crystal structure, adsorption properties and the like. The term "molecular sieves" is derived from the ability of these zeolite materials to selectively adsorb molecules on the basis of their size, form, and type. The various types of molecular sieves may be classified according to the size of the molecules which will be rejected (i.e. not adsorbed) by a particular sieve. A number of these zeolitic materials are described, for example, in U.S. Patent 3,069,362 wherein they are characterized by their composition and X-ray diffraction characteristics.

Among the well-recognized types of synthetic zeolites are the "Type X" and "Type Y" zeolites, which have essentially identical structures but differ in the ratio of silica to alumina contained in the final crystalline structure, i.e. "Type X" having a silica to alumina ratio below 3, e.g. about 2 to 3, and "Type Y" having a silica to alumina ratio above 3, e.g. about 3 to 7. The present invention is concerned with the "Type Y" zeolites.

In addition to their extensive use as adsorbents for hydrocarbon separation processes and the like, it has recently been found that crystalline alumino-silicate zeolites, particularly after cation exchange to reduce their $Na_2O$ content, are valuable catalytic materials for various processes, particularly hydrocarbon conversion processes. However, because of the extremely fine size crystals which are usually produced in the synthetic manufacture of molecular sieves, difficulties have been experienced in adapting these materials to commercial operations, particularly in moving or fluidized bed processes wherein the fine crystals are not readily fluidizable without excessive loss due to attrition and carry-over. Additionally, the crystalline zeolites are frequently unsuitable for direct use as catalysts because of their extremely high activities which cause difficulties in controlling the desired product selectivity. Accordingly, it has recently been discovered that an improved form of crystalline aluminosilicate zeolite, which is suitable for moving or fluidized bed operations, and particularly for hydrocarbon conversion processes, can be formed by admixing crystalline zeolite with a siliceous hydrogel or hydrosol, and drying the resulting admixture to form a composite product consisting of crystalline zeolite distributed throughout a siliceous gel matrix. This composite material has been found to exhibit improved catalytic selectivity, stability and fluidization properties.

In general, the chemical formula of the anhydrous crystalline alumino-silicate Type Y zeolites, expressed in terms of moles may be represented as $$0.9 \pm 0.2 \; Na_2O : Al_2O_3 : xSiO_2$$

wherein $x$ has a value above 3, preferably 3 to 7, more preferably 4 to 6.

The processes for synthetically producing crystalline Type Y zeolites are well known in the art. They involve crystallization from reaction mixtures containing: $Al_2O_3$ as sodium aluminate, alumina sol and the like; $SiO_2$ as sodium silicate and/or silica gel and/or silica sol; and $Na_2O$ as sodium hydroxide. Careful control is kept over the soda ($Na_2O$) concentration of the mixture, as well as the proportions of silica to alumina and soda to silica, the crystallization period, etc., to obtain the desired product. A conventional scheme for preparing crystalline alumino-silicate Type Y zeolites would be as follows:

Colloidal silica, such as commercial Ludox (supplied by E. I. du Pont de Nemours & Co. Inc.) is mixed with a solution of sodium hydroxide and sodium aluminate at ambient temperatures to produce a reaction mixture having the following molar ratios of reactants.

TABLE I

| Reactants, mole ratio: | Type Y |
|---|---|
| $Na_2O/SiO_2$ | 0.28 to 0.45. |
| $SiO_2/Al_2O_3$ | 8 to 30. |
| $H_2O/Na_2O$ | 20 to 60. |
| $SiO_2/Al_2O_3$ in product | 3 to 7, preferably 4–6. |

The reaction mixture may then be allowed to digest at ambient temperatures for up to 40 hours or more in order to aid crystallization, after which period it is heated at 180° to 250° F., e.g. 200° F. to 220° F., for a sufficient time to crystallize the product, e.g. 24 to 200 hours or more. The crystalline, metallo alumino-silicate is separated from the aqueous mother liquor by decantation or filtration and washed to recover a crystalline product.

In order to incorporate the crystalline alumino-silicate product into the siliceous matrix, the preformed zeolite crystals are added to a suitable gelatinous precipitate, hydrogel or hydrosol, e.g. colloidal silica sol, and the resulting mixture is homogenized by passage through a blending apparatus, such as a colloid mill, ball mill, and the like. The homogenized slurry is then formed into particles of the size range desired for fluidized bed operations. This is conveniently accomplished by spray drying, although other methods may be employed.

In those applications where the zeolite is desired to be employed as a catalyst, it is customary to subject the zeolite crystals to ion exchange with a metal cation or a hydrogen-containing cation to thereby reduce the sodium content (as $Na_2O$) to less than 10 wt. percent and preferably to about 1–5 wt. percent. Ion exchange may be performed either prior to or subsequent to the mixing of the matrix material and the zeolite.

The present invention is concerned with an improved process for preparing zeolite-silica gel matrix composite products in conjunction with a recently discovered process for preparing Type Y zeolites, which process is characterized by a low residual soluble salt concentration in the mother liquor subsequent to crystallization of the zeolite. As hereinbefore indicated, previous processes have generally employed a distinct separation of the zeolite product crystals from the mother liquor prior to their incorporation into the matrix material. It is one of the principal purposes of the present invention to effect the formation of a zeolite-silica gel matrix composite product by a procedure which does not require the distinct separtion of the zeolite product crystals from their mother liquor. By means of the present process, the various intermediate steps, e.g., filtration, washing, drying and final reslurrying of the zeolite crystals, may be conveniently eliminated without deleteriously affecting product quality.

The process of the present invention involves: admixture in the desired proportions of an aqueous slurry of silica, e.g. an aqueous sol of colloidal silica, a silica hydrogel slurry, etc., with the mother liquor containing precipitated zeolite crystals obtained from the crystallization of a particular reaction mixture (to be hereinafter described); strict adherence to prescribed limits of pH, total solids content, and soluble salt concentration of the resulting composite slurry mixture in order to prevent gel formation; and the subsequent evaporation of water from the fluid slurry mixture to form the desired zeolite-matrix composite product comprising zeolite crystals embedded in silica gel matrix. The evaporation is preferably accomplish by a rapid drying technique, e.g. spray drying.

The recently discovered procedure for preparing Type Y zeolites which is particularly adaptable to the process of the present invention involves the utilization of a high solids content reaction mixture wherein a large proportion of the ingredients is converted to crystalline zeolites. This procedure will hereinafter be referred to as the "high crystalline yield" process. Prior to the development of the "high crystalline yield" process, it had been found that in order to obtain crystalline Type Y zeolites containing the necessarily high silica to alumina molar ratio content, it was necessary to use very high ratios of silica to alumina in the reaction mixture, e.g. ratios of 8 to 40. With lower ratios in the reaction mixture the other crystalline zeolite types, e.g. the Type X zeolites, were obtained. However, the use of such high ratios of silica to alumina was subject to a major problem of extremely slow crystallization rate and to the lesser problems of low utilization of silica, i.e. low incorporation of silica into the final product, and variable composition of the zeolite. Thus, even where silica to alumina ratios of about 8 to 10 were used it was found necessary to carry out the crystallization in two steps; namely, a prolonged digestion step at ambient temperature, and a prolonged crystallization step, e.g. 2 to 8 days, at elevated temperature. It was observed that the proportions of the reactant materials in the reaction mixture were critical and, to a large degree, determined the crystallinity of product, the yield, the crystallization time, and the ratio of silica to alumina in the final crystalline product. Accordingly, it was discovered that careful control of these proportions within certain prescribed limits provided a remarkable improvement over the performance of prior processes. Specifically, an excellent quality product was obtained in a significantly reduced crystallization time, with a relatively high utilization of silica and a relatively low residual soluble salt content left in the mother liquor. This latter characteristic is of particular significance, as will be apparent in the succeeding discussion.

The improvement of the present invention is particularly useful in conjunction with the aforementioned "high crystalline yield" formation for the following reasons:

Firstly; the process of the present invention involves the direct admixture of the aqueous silica slurry (as colloidal silica, hydrosol, or hydrogel) and the alumino-silicate product crystals contained in their mother liquor, and the subsequent rapid evaporation of the resulting mixture. Therefore, any extraneous soluble salts derived from the original reaction mixture will be carried along into the final product; whereas in the conventional prior art processes involving filtration of the zeolite crystals, these salts would be removed in the liquid filtrate. It will be appreciated that because the process of the present invention does not employ this filtration step, the amount of this extraneous soluble material should preferably be minimized in order to obtain the highest order of purity for the final zeolitic product, since the subsequent rapid evaporation of the resulting admixture will cause it to be incorporated in the final product. Thus, it is particularly desirable to employ the "high crystallization yield" reaction mixture which is capable of forming zeolite crystals with a maximum utilization of reagents and a consequent minimum of residual soluble salts.

Secondly; a major problem has been experienced with the "high crystallization yield" technique; namely, that the zeolite crystals formed are extremely fine and consequently difficult to separate from the mother liquor by conventional separation means, e.g. filtration, sedimentation, centrifugation, etc. When such conventional means are used to separate the product crystals from the mother liquor of the "high crystallization yield" process, only a partial separation of the crystals is accomplished, due to either plugging of the filter medium or extremely poor settling characteristics, which thereby seriously limit the rate of liquid removal and product recovery. Because of these difficulties it becomes a practical economic necessity to either effectively improve this product separation step or, contrarily, to eliminate it entirely. Thus, an added incentive for the process of the present invention resides in the elimination of the difficult separation procedure experienced in the "high crystalline yield" process without deleteriously affecting the quality of the final product and without the attendant problems associated with the prior art processes.

Thirdly; it will be observed that a critical requirement of the improved process of the present invention, which incorporates the "high crystallization yield" process, is that the slurry admixture of zeolite crystals, mother liquor, and silica (e.g. colloidal silica, silica sol or hydrogel), be fluid in nature so that it may be subjected to a rapid drying operation such as spray drying. It was observed, however, that simple admixture of conventional Type Y zeolite-containing mother liquors and colloidal silica sol, e.g. commercial Ludox (containing 30 wt. percent silica), almost immediately caused a gel to form, which gel was not amenable to spray drying. It has now been discovered that strict control of (1) the total solids content, (2) the soluble salt concentration, and (3) the pH of the slurry admixture of zeolite crystals, mother liquor, and colloidal silica, silica sol or hydrogel, will prevent this gel formation and maintain the fluidity of the mixture. (Since the soluble salt concentration will be directly related to the total solids content of the mixture it will be sufficient to define the nature of the slurry admixture in terms of pH and total solids content, which conditions are to be regarded as critical. Specifically, it has been found that the composite slurry should have a total solids content within the range of about 3 to 12 wt. percent, preferably 4 to 7 wt. percent, and a pH within the range of about 10 to 13. Control of the solids content is conveniently accomplished by addition of sufficient water to produce the required solids content. The resulting slurry having the prescribed pH and total solids content, and derived in part from the "high crystalline yield" reaction mixture, will be fluid and pumpable for a sufficient period of time to accomplish the subsequent spray drying operation.

Thus, the important requirement of the present process that the composite admixture be fluid in nature without the tendency towards rapid gel formation is satisfied by three critical conditions, namely: a low total solids content (e.g. 3 to 12 wt. percent); a pH within the range of 10 to 13; and a low residual soluble salt concentration in the mother liquor. The use of the "high crystalline yield" reaction mixture with its high pH and low residual soluble salt concentration will inherently satisfy the latter two requirements, and the addition of sufficient water to the composite slurry (either simultaneously with or prior to the admixture of the two streams) will satisfy the first requirement.

The "high crystalline yield" Type Y zeolite process will now be described in detail.

Type Y zeolites are prepared from reaction mixtures having relatively low silica to alumina and silica to soda ($Na_2O$) ratios and low water content, to form highly crystalline alumino-silicate zeolites. The four principal reactants present in the reaction mixture of this process are the same as previously described for conventional processes; namely, alumina (as sodium aluminate, alumina sol, etc.), silica (as sodium silicate, silica sol, silica gel, etc.), soda (as sodium hydroxide, etc.), and water. Depending on their source, the proportions of the reactants are adjusted so that their relative ratios are as indicated below, which ratios are critical in determining crystallinity, yield and ratio of silica to alumina of the crystalline product. To produce Type Y zeolites (by the "high crystalline yield" process) having the desired silica to alumina ratios of 3 to 7, preferably 4 to 6, the reactant mole ratios should fall within the following ranges:

TABLE II

| | General | Preferred | Specific |
|---|---|---|---|
| $Na_2O/SiO_2$ | 0.25 to 0.60 | 0.32 to 0.57 | 0.33 to 0.55. |
| $SiO_2/Al_2O_3$ | 4 to less than 8 | 5.0 to 7.5 | 6 to 7. |
| $H_2O/Na_2O$ | 20 to 40 | 20 to 40 | 20 to 30. |
| $Na_2O/Al_2O_3$ | 1.6 to 3.5 | 2.1 to 3.4 | 2.20 to 3.40. |

The solids content of the resulting reaction mixture is within the range of about 24 to 40 wt. percent, e.g. 30 to 37 wt. percent.

The reaction mixture is digested at temperatures of about 60 to 100° F. for periods of about 1 to 40 hours, e.g. 2 to 10 hours, to aid the crystallization process. It is then heated at a temperature of 180° to 250° F., preferably 200° to 220° F., for a sufficient period to crystallize the zeolite product and preferably to achieve maximum crystallinity of product, as determined by periodic sampling and analysis of the reaction mixture. Crystallization times of 5 to 50 hours preferably 20 to 40 hours, have been found suitable, which times are significantly shorter than those required by the conventional processes hereinbefore described. The crystallization process may be stopped at the desired point by quenching the reaction mixture with additional water.

Briefly, therefore, the recently developed "high crystalline yield" process involves, for example, the admixture of a sufficient amount of sodium aluminate, sodium hydroxide and an aqueous sol of colloidal silica in the presence of added water to form a homogenous mixture having a composition as indicated in Table II; a digestion period, e.g. 2 to 10 hours, at ambient temeprature; and a subsequent aging period at elevated temperature, e.g. 200 to 220° F., for a sufficient period of time (e.g. 20 to 40 hours) to form synthetic Type Y crystalline sodium alumino-silicate zeolite.

In embodying the "high crystalline yield" process in the process of the present invention, the total slurry of crystalline Type Y zeolite contained in its mother liquor at a pH of above about 11 and a temperature of less than 100° F. is added to the aqueous silica slurry, e.g. colloidal silica sol, while the total solids content of the resulting mixture is maintained within the above-mentioned limits by addition of water, if necessary, in order to form a fluid mixture. The aqueous silica slurry, e.g. colloidal silica or silica hydrogel, may be derived from various sources. Prior to mixing with the slurry of zeolite crystals in the mother liquor, the solids content of the aqueous silica slurry may range from about 2 to 50 wt. percent solids. If a silica hydrogel is used, the preferred range will be 2 to 20 wt. percent solids. Additionally, the alkalinity of the aqueous silica slurry should be sufficient to produce the desired pH of 10 to 13 in the composite mixture. The fluid composite mixture is then subjected to high agitation conditions (e.g. with a colloid mill) to produce a fine dispersion, and is then subjected to a rapid evaporation technique, such as spray drying, flash drying, etc.

The spray drying step comprises spraying the composite mixture through nozzles into a tower containing hot flowing gases at a temperature at the nozzles in the range of about 400 to 650° F. This procedure is desired because of the increased attrition resistance achieved due to the spherical nature of the particles obtained, as well as the excellent particle size distribution useful for fluidized bed processes, e.g. predominantly 20 to 80 microns average particle diameter. Thus, by means of this spray drying step, a highly porous solid is obtained having improved attrition resistance due to the spherical nature of the particles.

After the spray drying step, the resulting zeolite-silica matrix composite is preferably water washed to remove water-soluble material and oven dried. The dry product is then normally subjected to a calcination treatment at temperatures above about 500° F., e.g. 500 to 1500° F., for about 8 to 24 hours. It may also be subjected to steam treatment at these temperature levels, e.g. 5 to 30 hours at 850 to 1200° F.

The final spray dried composite of the zeolite embedded in the silica matrix material, wherein the zeolite is in the sodium form, will contain between about 2 and 80 wt. percent zeolite depending upon its intended use.

As hereinbefore mentioned, in addition to use as an adsorbent, the spray dried composite of the sodium form zeolite embedded in the silica matrix material may also be used as a catalyst for catalytic cracking, hydrocracking, etc. When a catalytic material is desired, it will be preferable to subject the zeolite-matrix composite to ion exchange prior to final water washing and conventional drying. Ion exhange may be accomplished with any suitable cation to give the desired catalytic properties. Preferably, the ion exchange is accomplished with a metal cation or a hydrogen-containing cation so as to reduce the sodium content ($Na_2O$) of the zeolite to less than 10 wt. percent, preferably to about 1 to 5 wt. percent, based on the zeolite crystals. The metal cation can be any metal of Groups I to VIII and the rare earth metals, but preferably is a member of the group consisting of Groups II, III, IV, V, VI–B, VII–B, VIII, and rare earth metals. Particularly preferred for use as a cracking catalyst are the alkaline earth metals and especially magnesium and/or calcium. The hydrogen-containing cation is preferably a hydrogen ion or an ammonium ion.

For hydrocracking operations it has been found preferable to de-cationize the composite by initial exchange with ammonium ion followed by controlled heating at about 600 to 1000° F., or by exchange with hydrogen ion by treatment with dilute acids, to again reduce the soda content to within the above-mentioned ranges. The resulting de-cationized composites are then useful as supports for noble metal catalytic agents. Impregnation of noble metals may be accomplished, for example, by treating the composite with a platinum or palladium salt or an ammonium complex of these elements, e.g. ammonium chloroplatinate, palladium chloride, etc. The amount of catalytic metal in the finished catalyst is generally between 0.01 and about 5.0 wt. percent, preferably 0.1 to 3.0 wt. percent, based on the zeolite component. The catalyst is then usually subjected to a heat or hydrogen treatment at elevated temperatures, e.g. 500 to 1500° F. to reduce the platinum group metal, at least in part, to its elemental state.

The aforementioned ion exchange is accomplished by treatment of the zeolite-silica gel matrix composite with a suitable salt solution of the aforementioned metals or the hydrogen-containing cation at a temperature of 60 to 170° F. via conventional ion exchange techniques. The resulting ion exchange composite will contain at least 1 to 2 wt. percent, preferably 3 to 20 wt. percent, of the metals based on the weight of the zeolite. Suitable salt solutions include the sulfates, nitrates, and chlorides of magnesium, calcium, barium, and iron; hydrogen; ammonium; etc. After ion exchange the composite is thoroughly water washed, oven dried at about 200 to 350° F. and finally calcinated at 750 to 1200° F. The final product will generally comprise about 2 to 30 wt. percent crystalline zeolite embedded in 98 to 70 wt. percent of the silica gel matrix.

The invention will be further understood by reference to the following examples, which are given for illustrative purposes only and are not intended to be limiting.

Example 1

This example describes the preparation of zeolite Y-silica matrix by the process of the invention.

A crystalline alumino-silicate zeolite, having a silica to alumina mole ratio above 3, is prepared by the "high crystalline yield" process as follows. A slurry mixture of 90 grams of commercial sodium aluminate containing 38 wt. percent $Na_2O$, 38 wt. percent $Al_2O_3$, and 24% $H_2O$; and 20 grams of sodium hydroxide containing 75 wt. percent $Na_2O$; contained in 68 grams of water; is added with rapid stirring to 466 grams of a commercially available aqueous colloidal silica sol containing 30 wt. percent silica. ("Ludox" solution, supplied by E. I. du Pont de Nemours & Co. Inc.). Mixing is conducted at ambient temperature of 75° F. to form a homogeneous mixture. The molar composition of the resultant slurry is as follows:

$$2.4\ Na_2O : Al_2O_3 : 7.0\ SiO_2 : 70\ H_2O$$

with the total solids content of the slurry being about 34.7 wt. percent. The slurry is then kept at ambient temperature with stirring for a digestion period of about 4 hours, after which time it is placed in an oven at 212° F. in a sealed vessel for a period of about 24 hours which is the point of maximum crystallinity as determined by periodic sampling and analysis. The flask is then withdrawn from the oven, opened, and if desired an equal weight of water or more is added in order to quench the crystallization process.

To determine the crystallinity of the product crystals, a small portion of the solids contained in the reaction mixture is withdrawn at this point, filtered, washed and oven dried. The crystallinity and purity of the sample is determined by X-ray diffraction techniques and product analysis. The product is identified as being 100% zeolite Type Y.

In accordance with the present invention, the above-described slurry of zeolite product crystals contained in their mother liquor at a pH of about 12 and cooled to a temperature of 75° F. is directly combined with a diluted aqueous silica slurry without separation of the product crystals from their mother liquor. The aforementioned commercially available 30 wt. percent colloidal silica sol ("Ludox" solution) is diluted with water and utilized for this purpose. The total slurry of crystalline Type Y zeolite contained in its mother liquor as prepared above is added with stirring to 32 lbs. of a 30 wt. percent colloidal silica sol which is previously diluted with 148 lbs. water. The pH and total solids content of the resulting admixture are in the ranges of 10 to 12, and 4 to 7 wt. percent respectively. The composite mixture is recirculated through a colloid mill to ensure a fine dispersion of the crystalline zeolite and the resulting fluid dispersion is then spray dried by feeding it to a heated chamber with down-flowing hot air at a temperature of 550 to 600° F. at the inlet and about 240° F. at the bottom of the drying chamber.

To form a cracking catalyst, the spray dried composite product, consisting of Type Y zeolite embedded in silica matrix, is added to 100 lbs. of a 5% magnesium nitrate solution, and heated to 160° F. over about 1 hour with slow stirring. Stirring is stopped and the solids are allowed to settle. The supernatant liquor is removed by decantation, and the crystals are then washed by reslurrying in about 100 lbs. of water, followed by settling and decantation. This exchange and washing procedure is repeated three more times and the product is filtered, water washed, oven dried and then calcined at 1000° F. for 16 hours. The final product, designated as "Catalyst A," comprises 10 wt. percent crystalline zeolite Type Y embedded in 90 wt. percent of silica matrix. This represents a zeolite yield of about 73% based on the weight of total solids in the original reaction mixture prior to addition of the colloidal silica sol.

Example 2

This example describes the preparation of zeolite Y-silica matrix by a prior art process and the inherent difficulties in washing and handling experienced.

A Type Y zeolite-silica matrix composite product is prepared by the "high crystalline yield" process as follows. The same procedure as described in Part A is used except that the zeolite product crystals are separated from their mother liquor by filtration and centrifugation and the separated crystals after washing are ion exchanged in a similar manner, washed and dried. The preformed, dry, magnesium form-zeolite crystals are then combined with a silica hydrogel.

Specifically, after the completion of crystallization of the zeolite product, the total product slurry is diluted with about 5 gallons of water and stirred. The mixture is allowed to settle for 24 hours without agitation, after which time an extremely small proportion of the total solids is observed to have settled to the bottom of the container. The slurry is then filtered using a conventional vacuum filter. A very short time after suction is applied, the fine crystals tend to plug up the pores of the filter cloth so that very little liquid filtrate can subsequently be removed. The mixture is then subjected to centrifugation in a high speed Sharples solid bowl type centrifuge wherein about 80% of the liquid is removed per pass. Three passes through the centifuge are required to effect total separation of the product crystals. The crystalline product is oven dried at 250° F. Upon weighing it is found that only about a 50% yield of the original solids present in the slurry are recovered due to handling losses, thus demonstrating the extreme difficulty in filtering and centrifuging the zeolite product crystals obtained in this manner. This is considerably lower than the yield obtained when using the process of the invention, as illustrated in Example 1. The recovered oven dried crystals are then ion exchanged with a 5% magnesium sulfate solution following the procedure of Example 1.

Example 3

This example describes the technique of the process of the invention when used in conjunction with a conventional Type Y zeolite preparation, as opposed to the "high crystalline yield" process.

A type Y zeolite is prepared using a conventional procedure with the reactant ratios shown in Table I. The total slurry of crystalline Type Y zeolite contained in its mother liquor at room temperature is added to 32 lbs. of 30 wt. percent colloidal silica sol ("Ludox" solution) which has not been diluted with water as in Example 1, so as to produce the required total solids content. Upon addition, a gel forms immediately and the resulting mass cannot be spray dried.

Example 4

To demonstrate the utility of the composite zeolite-silica matrix products, "Catalyst A" of Example 1 is used to convert a heavy West Texas virgin gas oil having a boiling range of 650° to 875° F., a sulfur content of 1.1% and an A.P.I. gravity of 26.9 in a fluidized bed cracking unit in a batchwise operation at a temperature of 960° F. using a 3-minute cycle time. A substantial portion of the original feed is converted to $C_5/430°$ F. naphtha.

In summary, the present invention relates to a process for synthetically producing crystalline alumino-silicate Type Y zeolites which are useful for adsorption and hydrocarbon conversion purposes, which process comprises the steps of forming said zeolite from a specific reaction mixture, combining the product slurry contained in its mother liquor without separation of product crystals with an aqueous silica slurry, maintaining the pH and solids content of the composite mixture within prescribed limits to prevent gel formation, and subjecting the composite mixture to a rapid evaporation step to form a composite product comprising said zeolite embedded in a silica gel matrix which is suitable for fluidized bed operation and has high resistance to attrition.

What is claimed is:

1. An improved process for preparing crystalline alumino-silicate zeolite having uniformly dimensioned pores and embedded in a silica gel matrix, said zeolite having the following molar ratio of constituents:

$$0.9 \pm 0.2 \ Na_2O:Al_2O_3:x \ SiO_2$$

wherein $x$ has a value above 3, which comprises crystallizing said zeolite from an aqueous reaction mixture containing $Na_2O$, $SiO_2$ and $Al_2O_3$ at elevated temperature, wherein the molar ratios of the constituents in the reaction mixture are within the following ranges:

| | |
|---|---|
| $Na_2O/SiO_2$ | 0.25 to 0.60. |
| $SiO_2/Al_2O_3$ | 4 to less than 8. |
| $H_2O/Na_2O$ | 20 to 40. |
| $Na_2O/Al_2O_3$ | 1.6 to 3.5. | to form a product slurry mixture comprising zeolite product crystals and mother liquor; admixing said product slurry mixture with an aqueous silica slurry to form a fluid admixture having a pH of about 10 to 13 and a total solids content of about 3 to 12 wt. percent; and subjecting said fluid admixture to a rapid drying operation to form a composite material comprising said zeolite embedded in said silica gel matrix.

2. The process of claim 1 wherein said elevated temperature is within the range of 180° to 250° F. and said reaction mixture is aged at said temperature for a time sufficient to crystallize said zeolite.

3. The process of claim 2 wheerin said reaction mixture is aged at said temperature for a period of 5 to 50 hours.

4. The process of claim 3 which additionally comprises aging said reaction mixture for a period of about 1 to 40 hours at a temperature of about 60 to 100° F. prior to crystallization at said elevated temperature.

5. The process of claim 1 which additionally comprises subjecting the dried zeolite-matrix composite to base exchange with an aqueous solution of an ion selected from group consisting of hydrogen-containing cations; cations of metals in Groups II, III, IV, V, VI–B, VII–B, VII; and cations of rare earth metals.

6. An improved process for preparing crystalline alumino-silicate zeolite embedded in a silica gel matrix, said zeolite having uniformly dimensioned pores and the following molar ratio of constituents:

$$0.9 \pm 0.2 \ Na_2O:Al_2O_3:x \ SiO_2$$

wherein $x$ has a value above 3, which comprises crystallizing said zeolite from an aqueous reaction mixture containing $Na_2O$, $SiO_2$ and $Al_2O_3$ at elevated temperature, wherein the molar ratios of the constituents in the reaction mixture are within the following ranges:

| | |
|---|---|
| $Na_2O/SiO_2$ | 0.32 to 0.57. |
| $SiO_2/Al_2O_3$ | 5.0 to 7.5. |
| $H_2O/Na_2O$ | 20 to 40. |
| $Na_2O/Al_2O_3$ | 2.1 to 3.4. | to form a product slurry mixture comprising zeolite product crystals and mother liquor; admixing said product slurry mixture with an aqueous silica slurry to form a fluid admixture having a pH of about 10 to 13 and a total solids content of about 3 to 12 wt. percent; and subjecting said fluid admixture to a rapid drying operation to form a composite material comprising said zeolite embedded in said silica gel matrix.

7. The process of claim 6 wherein said elevated temperature is within the range of 180° to 250° F. and said reaction mixture is aged at said temperature for a time sufficient to crystallize said zeolite.

8. The process of claim 7 wherein said reaction mixture is aged at said temperature for a period of 5 to 50 hours.

9. The process of claim 8 which additionally comprises aging said reaction mixture for a period of about 1 to 40 hours at a temperature of about 60 to 100° F. prior to crystallization at said elevated temperature.

10. The process of claim 6 which additionally comprises subjecting the dried zeolite-matrix composite to base exchange with an aqueous solution of an ion selected from group consisting of hydrogen-containing cations; cations of metals in Groups II, III, IV, V, VI–B, VII–B, VIII; and cations of rare earth metals.

11. The process of claim 6 wherein said rapid drying operation is spray drying.

12. A crystalline zeolite-silica matrix product produced by the process of claim 1.

References Cited

UNITED STATES PATENTS 2,882,243    4/1959    Milton    252—455

FOREIGN PATENTS 650,503    10/1962    Canada.

OSCAR R. VERTIZ, *Primary Examiner.*

H. S. MILLER, *Assistant Examiner.*